United States Patent
Liu et al.

(10) Patent No.: US 11,699,240 B2
(45) Date of Patent: Jul. 11, 2023

(54) TARGET TRACKING METHOD AND APPARATUS, AND STORAGE MEDIUM

(71) Applicant: BEIJING SENSETIME TECHNOLOGY DEVELOPMENT CO., LTD., Beijing (CN)

(72) Inventors: Shaohui Liu, Beijing (CN); Hongwei Qin, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/819,487

(22) Filed: Mar. 16, 2020

(65) Prior Publication Data

US 2020/0258242 A1 Aug. 13, 2020

Related U.S. Application Data (63) Continuation of application No. PCT/CN2019/076355, filed on Feb. 27, 2019.

(30) Foreign Application Priority Data

Mar. 6, 2018 (CN) .......... 201810182797.X
Mar. 6, 2018 (CN) .......... 201810184967.8

(51) Int. Cl.
*G06T 7/246* (2017.01)
*G06T 7/70* (2017.01)

(52) U.S. Cl.
CPC ........... *G06T 7/248* (2017.01); *G06T 7/70* (2017.01); *G06T 2207/10016* (2013.01); *G06T 2207/30241* (2013.01)

(58) Field of Classification Search
None
See application file for complete search history.

(56) References Cited

U.S. PATENT DOCUMENTS

2011/0286631 A1 11/2011 Wagner
2012/0093364 A1 4/2012 Sato
(Continued)

FOREIGN PATENT DOCUMENTS

CN 101169827 A 4/2008
CN 106326837 A 1/2017
(Continued)

OTHER PUBLICATIONS

International Search Report in the international application No. PCT/CN2019/076354, dated May 28, 2019, 2 pgs.
(Continued)

*Primary Examiner* — Vikkram Bali
(74) *Attorney, Agent, or Firm* — Cooper Legal Group, LLC (57) ABSTRACT

A target tracking method includes: obtaining feature data of a reference frame of a first image frame, wherein the first image frame and at least one second image frame have the same reference frame; and determining the position of a tracking target in the first image frame based on the feature data of the reference frame. Based on the embodiments in the present disclosure, feature data of a reference frame of a first image frame is acquired, and the position of a tracking target in the first image frame is determined based on the feature data of the reference frame.

14 Claims, 5 Drawing Sheets

(56) References Cited

U.S. PATENT DOCUMENTS

| | | | |
|---|---|---|---|
| 2012/0120237 A1* | 5/2012 | Trepess | H04N 5/144 348/143 |
| 2013/0113941 A1 | 5/2013 | Yoneyama | |
| 2015/0131851 A1 | 5/2015 | Bernal et al. | |
| 2015/0221136 A1 | 8/2015 | Shaburova | |
| 2015/0369918 A1 | 12/2015 | Tacke | |
| 2016/0180197 A1 | 6/2016 | Kim et al. | |
| 2017/0084045 A1* | 3/2017 | Hsu | G08B 13/19604 |
| 2019/0096069 A1* | 3/2019 | Qian | G06T 7/74 |
| 2019/0197703 A1 | 6/2019 | Wang et al. | |
| 2019/0205694 A1* | 7/2019 | Wang | G06K 9/00268 |
| 2020/0160099 A1* | 5/2020 | Chen | G06K 9/4642 |

FOREIGN PATENT DOCUMENTS

| | | |
|---|---|---|
| CN | 106529587 A | 3/2017 |
| CN | 106909909 A | 6/2017 |
| CN | 107169939 A | 9/2017 |
| CN | 107562805 A | 1/2018 |
| CN | 108416799 A | 8/2018 |
| CN | 108460787 A | 8/2018 |
| JP | 2000113158 A | 4/2000 |
| JP | 2010145965 A | 7/2010 |
| JP | 2011060167 A | 3/2011 |
| JP | 2011-118782 A | 6/2011 |
| JP | 2012159958 A | 8/2012 |
| JP | 2013021726 A | 1/2013 |
| JP | 2014241505 A | 12/2014 |
| JP | 2016085487 A | 5/2016 |
| JP | 2017156886 A | 9/2017 |
| JP | 2018026108 A | 2/2018 |
| WO | 2013001940 A1 | 1/2013 |
| WO | 2017080399 A1 | 5/2017 |

OTHER PUBLICATIONS

International Search Report in the international application No. PCT/CN2019/076355, dated May 28, 2019, 2 pgs.

"High-Speed Tracking with Kernelized Correlation Filters"; Nov. 2014; Joao F. Henriques, Rui Caseiro, Pedro Martins and Jorge Batista; IEEE Transactions on Pattern Analysis and Machine Intelligence, 14 pgs.

"Learning to Track at 100 FPS with Deep Regression Networks"; Aug. 2016; David Held, Sebastian Thrun and Silvio Savarese, In European Conference on Computer Vision, Springer, 26 pgs.

Mask R-CNN; Oct. 2017; Kaiming He, Georgia Gkioxari, Piour Dollar and Ross Girshick, In The IEEE International Conference on Computer Vision (ICCV), 9 pgs.

"Object Tracking Benchmark"; Sep. 2015; Yi Wu, Jongwoo Lim and Ming-Hsuan Yang; IEEE Transactions on Pattern Analysis and Machine Intelligence, vol. 37, No. 9, 15 pgs.

First Office Action of the Chinese application No. 201810182797.X, dated Nov. 29, 2019, 12 pgs.

Second Office Action of the Chinese application No. 201810182797.X, dated May 28, 2020, 18 pgs.

First Office Action of the Chinese application No. 201810184967.8, dated Jul. 1, 2019, 14 pgs.

Second Office Action of the Chinese application No. 201810184967.8, dated Apr. 14, 2020, 16 pgs.

Second Office Action of the Japanese application No. 2020-516424, dated Sep. 3, 2021, 6 pgs.

Final Office Action of the U.S. Appl. No. 16/822,177, dated Sep. 9, 2021, 20 pgs.

"FlowNet: Learning Optical Flow with Convolutional Networks", Dec. 2015, Alexey Dosovitskiy, Philipp Fischer, Eddy Ilg, Philip Hausser, Caner Hazirbas, Vladimir Golkov, Patrick Van De Smagt, Daniel Cremers and Thomas Brox, IEEE International Conference on Computer Vision, US, IEEE, pp. 2758-2766.

First Office Action of the Japanese application No. 2020-516424, dated May 20, 2021, 6 pgs.

First Office Action of the Japanese application No. 2020-516429, dated May 18, 2021, 13 pgs.

First Office Action of the U.S. Appl. No. 16/822,177, dated Mar. 26, 2021, 20 pgs.

English translation of the Written Opinion of the International Search Authority in the international application No. PCT/CN2019/076354, dated May 28, 2019, 4 pgs.

English translation of the Written Opinion of the International Search Authority in the international application No. PCT/CN2019/076355, dated May 28, 2019, 5 pgs.

Notice of Allowance of the U.S. Appl. No. 16/822,177, dated Nov. 17, 2021, 18 pgs.

Written Opinion of the Singaporean application No. 11202002622Q, dated Jun. 29, 2022, 9 pgs.

Written Opinion of the Singaporean application No. 11202002621S, dated Jul. 1, 2022, 9 pgs.

* cited by examiner

TARGET TRACKING METHOD AND APPARATUS, AND STORAGE MEDIUM

CROSS REFERENCE TO RELATED APPLICATIONS

This is a continuation of International Patent Application No. PCT/CN2019/076355 filed on Feb. 27, 2019, which claims priority to Chinese Patent Applications No. 201810184967.8 and No. 201810182797.X, which were filed on Mar. 6, 2018. The disclosures of International Patent Application No. PCT/CN2019/076355 and Chinese Patent Applications No. 201810184967.8 and No. 201810182797.X are hereby incorporated by reference in their entireties.

BACKGROUND

Target tracking constantly refers to that, under the condition that position information of a target object in a first frame of a video sequence is given, predicting the position of the target object in a subsequent image frame of the video sequence. Target tracking technologies are widely applied to application scenarios such as video monitoring, unmanned driving, and human-computer interaction. Since the amount of time consumed by the detection technology and the segmentation technology for a single frame are relatively high, the target tracking technology is usually used together with a detection/segmentation technology for increasing the video processing speed and ensuring a better real-time performance Therefore, the requirement on the speed of a target tracking algorithm for a particular task in practical engineering is high.

SUMMARY

The present disclosure relates to computer vision technologies, and in particular, to a target tracking method and apparatus, and a storage medium Embodiments of the present disclosure provide a target tracking technology.

According to an aspect of the embodiments of the present disclosure, a target tracking method is provided, including: obtaining feature data of a reference frame of a first image frame, where the first image frame and at least one second image frame have a same reference frame; and determining a position of a tracking target in the first image frame based on the feature data of the reference frame.

According to another aspect of the embodiments of the present disclosure, a target tracking apparatus is provided, including: a processor; and a memory, configured to store instructions executable by the processor, wherein the processor is configured to: obtain feature data of a reference frame of a first image frame, where the first image frame and at least one second image frame have a same reference frame; and determine a position of a tracking target in the first image frame based on the feature data of the reference frame.

According to another aspect of the embodiments of the present disclosure, a computer storage medium is provided, having stored thereon computer-readable instructions that, when being executed by a processor, cause the processor to implement the foregoing target tracking method.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. Generally, the program modules may include routines, programs, target programs, components, logics, data structures, and the like for performing specific tasks or implementing specific abstract data types. In the distributed computing environments, the program modules may be located in local or remote computing system storage media including storage devices.

Figure 1:
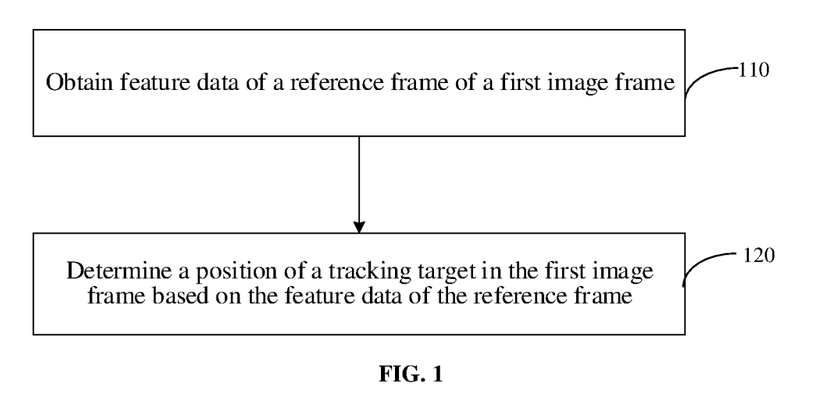
FIG. 1 is a flowchart for a target tracking method provided in embodiments of the present disclosure.

FIG. 1 is a flowchart for a target tracking method provided in embodiments of the present disclosure. The method may be performed by any electronic device, such as a terminal device, a server, or a mobile device.

At 110, feature data of a reference frame of a first image frame is obtained.

In an optional example, the operation 110 may be executed by a processor by invoking a corresponding instruction stored in a memory, or may be executed by a feature obtaining unit 21.

In order to track a tracking target, in some embodiments, multiple image frames of the tracking target are collected by means of video and the like, and the position of the tracking target in these image frames is determined, so that the trajectory of the tracking target in these target images by time may be determined by combining the time for obtaining the image frames, thereby realizing tracking of the tracking target.

In some embodiments, in order to track a tracking target, it is required to know the position of the tracking target in one image frame, and the tracking target currently required to be tracked is determined based on the position; or it is known that the tracking target is a certain particular target (for example, a face or human body), multiple image frames are collected for the determined tracking target.

According to one or more embodiments of the present disclosure, according to the definition of a target tracking issue, tracking of a tracking target may be realized based on the determined position of the tracking target in one or more images. The tracking target in the embodiments of the present disclosure may be a known or an unknown particular object, human or an object of other types, which is not defined in the embodiments of the present disclosure.

In the embodiments of the present disclosure, at least two image frames use a same reference frame, and in some embodiments, the at least two image frames are adjacent to each other. For example, in the embodiments of the present disclosure, the reference frame is updated once at every M frames, and adjacent (M−1) image frames correspond to a same reference frame, where M is a preset value greater than or equal to 2, and the preset value may be determined according to actual application requirements. However, the value of M and the implementations of the multiple image frames using a same reference frame are not defined in the embodiments of the present disclosure.

In the embodiments of the present disclosure, a certain image frame may be adjacent to or not adjacent to a reference frame thereof. For example, a first image frame is separated from a reference frame thereof by one or more image frames. For example, a first image frame is separated from the reference frame thereof by N image frames, where N is a value greater than or equal to 1. The value of N is not defined in the embodiments of the present disclosure.

In this way, a first image frame and other image frames (for example, one or more second image frames) use the same reference frame, where a second image frame may be located in front of or behind the first image frame, and compared with other target tracking approaches in which different reference frames are used for each frame of target image, the processing efficiency of the target tracking may be improved.

According to one or more embodiments of the present disclosure, the reference frame of the first image frame may include one or more image frames, where the multiple image frames may be adjacent to or not adjacent to each other in the video stream. For example, the multiple reference frames may be K adjacent reference frames in the video stream; or, a part of adjacent reference frames in the multiple reference frames are adjacent to each other in the video stream, and the other part of adjacent reference frames in the multiple reference frames are not adjacent to each other in a video; or, any two adjacent reference frames in the multiple reference frames are not adjacent to each other in the video stream. In some embodiments, multiple reference frames may be separated by one or more images. In some embodiments, any two adjacent image frames in the multiple image frames are separated by a same number of image frames, for example, M image frames, where M is a preset value greater than or equal to 2. The value of M may be determined according to application scenarios and requirements, and is not defined in the embodiments of the present disclosure. Or, different adjacent image frames in the multiple image frames may also be separated by different number of image frames, which is not defined in the embodiments of the present disclosure.

It should be understood that, the term "adjacent images or adjacent reference images in multiple reference images" in this document refer to reference images that are adjacent to each other after the multiple reference images are sorted by a certain sorting rule, where the sorting rule may be sorting by the collection time, the detection time, etc.; and the term "adjacent images in a video stream" in this document may refer to images that are adjacent to each other after multiple images in a video stream or a video stream clip are sorted, where the sorting may refer to the original order in the video stream or a certain particular sorting rule. The specific implementation of the sorting is not defined in the embodiments of the present disclosure.

In the embodiments of the present disclosure, feature data of a reference frame may be obtained by multiple manners. In some embodiments, feature data of a reference frame may be obtained from other apparatuses. For example, a server receives feature data of a reference frame sent by a terminal device. For another example, an electronic device obtains feature data of a reference frame from a database, where the database may be provided in the local electronic device or other devices. In other embodiments, feature extraction may be performed on a reference frame to obtain feature data thereof.

In one or more embodiments, an electronic device may obtain the stored feature data of a reference frame. For example, feature data of a reference frame is obtained from a memory. In some embodiments, feature data of a reference frame may be stored in a buffer in the process of processing the reference frame (for example, determining position information of a tracking target in the reference frame), and is then obtained from the buffer, but the embodiments of the present disclosure are not limited hereto.

In the embodiments of the present disclosure, a target image may be adjacent to multiple reference images thereof. Or a target image may be separated from the reference images thereof by at least one image frame (which is called as a second image). In some embodiments, a target image may be separated from any reference image in multiple reference images thereof by one or more images; or a target image may be adjacent to a part of reference images in multiple reference images, and is separated from the other part of reference images in multiple reference images by one or more images, which is not defined in the embodiments of the present disclosure. Compared with the approach which use a previous image frame of a target image as a reference image, the technical solution provided in the embodiments of the present disclosure may improve the prediction precision due to the fact that the prediction on an earlier image is more accurate, and the error accumulation problem may be efficiently solved by using an earlier image as a reference image for tracking.

In the embodiments of the present disclosure, different images may have different reference images, or multiple images may use the same reference image. For example, a target image and at least one third image may have the same reference images. For example, multiple reference images of a target image are identical to those of a third image, or, a part of reference images in multiple reference images of a target image are also reference images of the third image, which is not defined in the embodiments of the present disclosure. In some embodiments, the at least one third image may be adjacent to the target image, but the embodiments of the present disclosure are not limited hereto. In this case, in some embodiments, features of a reference image may be stored in a buffer, and it is merely needed to invoke the stored feature of the reference image when predicting the position of a tracking target of an image, thereby increasing the prediction speed of the position.

In the embodiments of the present disclosure, the feature of a reference frame may be obtained by multiple manners. In some embodiments, the feature of a reference image may be obtained from other apparatuses. For example, a server receives a feature of a reference image sent by a terminal device. For another example, an electronic device obtains a feature of a reference image from a database, where the database may be provided in the local electronic device or other devices. In other embodiments, feature extraction may be performed on a reference image to obtain a feature thereof after the reference image is obtained.

In one or more optional embodiments, features of multiple reference images stored by a memory of an electronic device may be obtained. For example, features of multiple reference images of a target image are obtained from a second buffer. In some embodiments, a feature of a reference image may be stored in a second buffer, and obtained from same, where the second buffer may also be called as a location exemplar buffer. However, the name of the second buffer is not defined in the embodiments of the present disclosure.

In the embodiments of the present disclosure, the second buffer may be used for storing information of a reference image. In some embodiments, the second buffer may store information of multiple images currently used as reference images, i.e., information of multiple reference images currently included in a reference image list. For example, the second buffer may store a feature of a reference image, or may further store position information of a tracking object in the reference image, which is not defined in the embodiments of the present disclosure.

In a target tracking method implemented based on a depth recurrent network, the depth recurrent network consists of a reference image branch and a target image branch. The reference image branch may obtain valuable information of a location exemplar by using a reference image feature extractor, so as to guide the target image branch to predict the position of a target object. In some embodiments, the policy of using a $(t-1)^{th}$ frame to predict a $(t)^{th}$ frame is generally used. However, in fact, when predicting the position of the target object in the $(t)^{th}$ frame, all the images in front of a $(t-2)^{th}$ frame has passed through the feature extractor of the reference image branch, and an effective location exemplar has been obtained. Therefore, the reuse of the location exemplar may be implemented, thereby increasing the speed of a tracking system.

In order to increase the tracking speed, feature data obtained based on a reference frame is stored in a memory. The feature data may be obtained by performing feature extraction on the reference frame. An image frame for obtaining a final position of a tracking target may also be stored in the memory as a reference frame so as to determine the position of the tracking target in subsequent image frames.

At 120, the position of a tracking target in the first image frame is determined based on the feature data of the reference frame.

In an optional example, the operation 120 may be executed by a processor by invoking a corresponding instruction stored in a memory, or may be executed by a position determining unit 22.

In some embodiments, the position of a tracking target may include coordinate information of the tracking target in a first image frame, for example, coordinate information of a bounding box of the tracking target in the first image frame, etc., which is not defined in the embodiments of the present disclosure.

In some embodiments, a first image frame is separated from a reference frame by at least one image frame.

Figure 2:
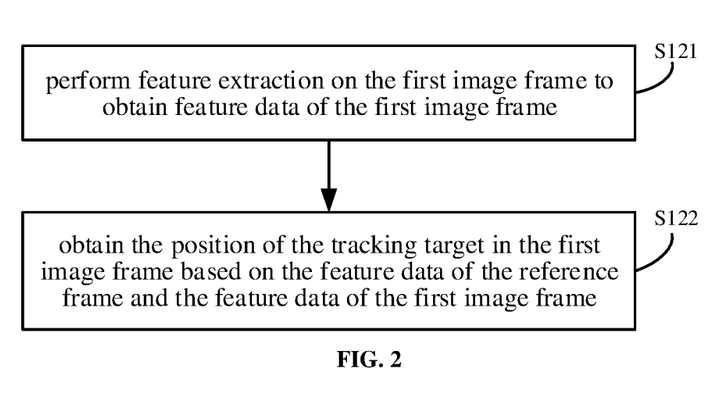
FIG. 2 is a flowchart for a target tracking method provided in embodiments of the present disclosure.

FIG. 2 is a flowchart for a target tracking method provided in embodiments of the present disclosure. The operation 120 may include the following operations 121 and 122.

At 121, feature extraction may be performed on a first image frame to obtain feature data of the first image frame.

At 122, a position of a tracking target in the first image frame is determined based on the feature data of the first image frame and feature data of the reference frame.

In some embodiments, feature extraction may be performed on an image frame by means of a neural network. For example, a convolution operation is performed on a first image frame by means of a convolutional layer in a convolutional neural network, to obtain feature data of the first image frame, where the feature data may optionally be a feature map or in other formats. The manner of extracting the feature data and the specific implementation formats of the obtained feature data are not limited in the embodiments of the present disclosure.

In some embodiments, feature data of a first image frame and that of a reference frame may be connected (or spliced) to obtain a connection feature, and the position of a tracking target in the first image frame is obtained based on the connection feature or the splicing feature.

Connection (or splicing) here refers to overlaying of channels. For example, a first image frame outputs three feature maps via three channels, a reference frame outputs three feature maps via three channels, and six feature maps may be obtained by means of the feature connection.

In the embodiments of the present disclosure, there may be multiple manners for obtaining the position of a tracking target based on the connection feature. In some optional embodiments, the position of a tracking target may be obtained by using the processing of a full-connection layer and/or other network layers, which is not defined in the embodiments of the present disclosure.

In some embodiments, a connection feature may be processed to obtain coordinates corresponding to a tracking target in a first image frame.

The range corresponding to the obtained coordinates is the position of the tracking target in the first image frame.

In some optional embodiments, relative position information of a tracking target in a reference frame relative to a tracking target in a first image frame may be obtained based on feature data of the reference frame, and the position of the tracking target in the first image frame is obtained based on the relative position information and position information of the tracking target in the reference frame.

According to one or more embodiments of the present disclosure, the relative difference between a first image frame and a reference frame may be determined based on feature data of the reference frame and that of the first image frame, and relative position information of a tracking target in the first image frame and the reference frame may be determined based on the relative difference between the feature data. The relative position information herein may indicate the relative distance of the tracking target moving from the reference frame to the first image frame. Since position information of the tracking target in the reference frame is known, the position of the tracking target in the first image frame may be determined based on the known position information of the reference frame as well as the relative position information.

In other target tracking methods, the policy of using a $(t-1)^{th}$ frame to predict a $(t)^{th}$ frame is generally used. In fact, when determining the position of the of target object in the $(t)^{th}$ frame, all the images in front of a $(t-2)^{th}$ frame has passed through the feature extractor of the reference image branch, and an effective location exemplar has been obtained. The speed of a tracking system may be increased by using the forward property of the depth recurrent network.

Since the object displacement between two adjacent frames is not large, the position of a $(t-2)^{th}$ frame, a $(t-3)^{th}$ frame, or a $(t-K)^{th}$ frame can be utilized to predict the position in the $(t)^{th}$ frame. Therefore, if let the $(t-1)^{th}$ frame not to pass through the reference image branch, a large amount of time may be saved.

Considering the actual industrial production scenario, if updating a location exemplar in the reference image branch at every K frames is utilized for the collected video frames, nearly 2K/(K+1) times of increase on the speed may be realized. Such significant improvement may further improve the real-time performance in actual applications, and reduce the power consumption of a device.

In the embodiments of the present disclosure, multiple target image frames may use the same reference frame. In this way, when predicting the position of a tracking target in a certain target image, the stored feature data of a reference frame may be invoked, thereby increasing the prediction speed of the position. Moreover, the policy of not using a previous image frame as a reference frame may improve the precision due to the fact that the precision of the position of a tracking target in a reference frame obtained by detection in the embodiments of the present disclosure is higher, and the prediction on the position of a tracking target in an earlier image frame is more accurate. The error accumulation problem may be efficiently solved by using an earlier image frame as a reference frame for tracking.

According to the target tracking method provided in the embodiments of the present disclosure, feature data of a reference frame of a first image frame is obtained, and the position of a tracking target in the first image frame is determined based on the feature data of the reference frame. Since the first image frame and at least one second image frame have a same reference frame, reuse of the feature data is implemented, thereby reducing the number of times calculation is performed on the feature data, and increasing the tracking speed.

In some optional examples, the operation 120 may include: determining multiple initial predicted positions of a tracking target in a first image frame based on feature data of a reference frame; and determining a final position of the tracking target in the first image frame based on the multiple initial predicted positions.

According to one or more embodiments of the present disclosure, the initial predicted position and/or the final position may refer to the position of a bounding box corresponding to the tracking target, for example, the position of a box of a face, of a human body or of a particular object or part. The specific form of the position of the tracking target is not defined in the embodiments of the present disclosure.

In some embodiments, average processing is performed on multiple initial predicted positions, such as, for example, mathematical average or weighted average and the like, to obtain a final position of a tracking target in a first image frame. In other embodiments, at least one initial predicted position may be selected from multiple initial predicted positions, and a final position of a tracking target in a first image frame is obtained based on the at least one initial predicted position.

In one or more optional embodiments, a final position of a tracking target in a first image frame is obtained based on the confidence of multiple initial predicted positions.

According to one or more embodiments of the present disclosure, at least one initial predicted position is selected from multiple initial predicted positions based on the confidence of the multiple initial predicted positions, and a final position is determined based on the at least one initial predicted position. For example, at least one initial predicted position having a higher confidence is selected from multiple initial predicted positions, where the at least one initial predicted position may be a preset number of positions having the highest confidence in the multiple initial predicted positions, and may also be the position having the confidence greater than a second preset threshold in the multiple initial predicted positions, which are not defined in the embodiments of the present disclosure.

The confidence refers to the probability that the predicted position corresponds to the actual position of the tracking target in the first image frame. In some embodiments, the confidence is obtained by a scoring network. The scoring network is a trained neural network. For example, a network for binary classification is used, when the predicted position overlaps with the actual position, a true value of 1 and a predicted value of 0 are output, and when the predicted position does not overlap with the actual position, a real value of 0 and a predicted value of 1 are output, etc. The specific implementation of the scoring network is not defined in the embodiments of the present disclosure.

In some embodiments, the average value of the selected at least one initial predicted position is used as a final position, where the average value may be an arithmetic average value, a geometric average value, or a weighted average value. For example, weighted average is performed on the selected at least one initial predicted position to obtain a final position of a tracking target in a first image frame. The weighted value of the initial predicted position is relevant to the confidence thereof. The higher the confidence, the larger the weighted value, and the lower the confidence, the smaller the weighted value. However, the embodiments of the present disclosure are not limited hereto.

The initial predicted position having a larger deviation in the obtained initial predicted positions may be deleted according to the confidence. Accordingly, the obtained final position is more approximate to the actual position of the tracking target in the target image, thereby realizing better tracking.

According to one or more embodiments of the present disclosure, determining the confidence of at least one initial predicted position in multiple initial predicted positions includes:

separately processing the multiple initial predicted positions by a confidence scoring network to obtain the confidence corresponding to the multiple initial predicted positions, where the confidence scoring network is obtained through training. The trained confidence scoring network corresponding to the input initial predicted position may output a corresponding confidence. In some embodiments, an error may be obtained based on the predicted confidence and the actual confidence. The scoring network is trained by a reverse gradient propagation method according to the error. The trained scoring network may better predict the probability that the predicted position is the actual position (the known target position). The scoring network trains a particular object required to be tracked. For example, if a face needs to be tracked, the face is used to train the scoring network.

According to one or more embodiments of the present disclosure, before separately processing the multiple initial predicted positions by a confidence scoring network to obtain the confidence corresponding to the multiple initial predicted positions, further includes:

processing at least one initial predicted position of a sample image by the confidence scoring network to obtain a predicted confidence corresponding to the at least one initial predicted position;

determining the actual confidence of the at least one initial predicted position based on an annotated position of the sample image; and training the confidence scoring network based on the predicted confidence and the actual confidence of the at least one initial predicted position.

In order to improve the accuracy of the confidence scoring network, the confidence scoring network needs to be trained. The training process is the same as that of a neural network, in which the confidence scoring network is trained based on the known actual confidence of a sample image. In some embodiments, targeted trainings may be used for different tracking objects. For example, when a face needs to be tracked, the confidence scoring network is trained by a face image having the known confidence in the process of training the confidence scoring network, so that the obtained confidence score of the face image from the confidence scoring network is more accurate.

Figure 3:
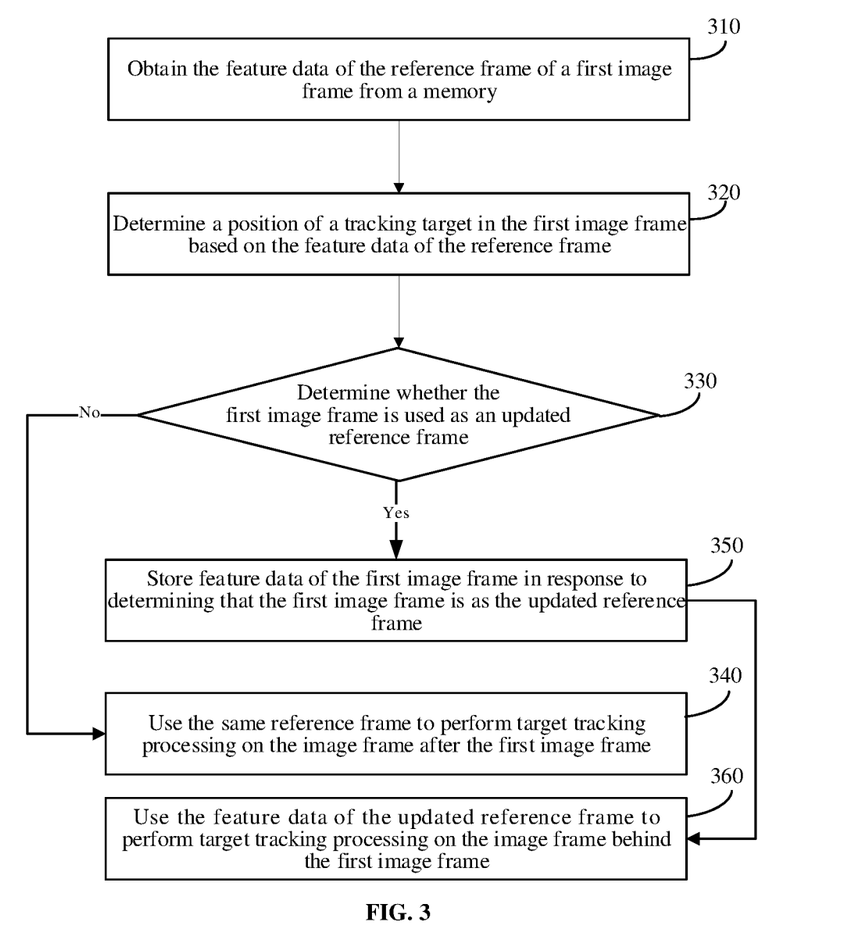
FIG. 3 is a flowchart for a target tracking method provided in embodiments of the present disclosure.

FIG. 3 is a flowchart for a target tracking method provided in embodiments of the present disclosure. As illustrated in FIG. 3, the method may further include the following operations 310 to 360.

At 310, the feature data of the reference frame is obtained from a memory.

At 320, the position of a tracking target in the first image frame is determined based on the feature data of the reference frame.

The operations 310 and 320 has been described above in the embodiments of the present disclosure referring to FIG. 1, and the operation 320 is the same as the operation 120 in FIG. 1.

At 330, whether to use a first image frame as an updated reference frame is determined by the electronic device.

At 340, if it is determined not to update the reference frame, i.e., in response to determining that a first image frame is not used as an updated reference frame, the same reference frame is continually used to perform target tracking processing on the image frame after the first image frame.

At 350, if it is determined to update the reference frame, i.e., in response to determining that a first image frame is used as an updated reference frame, the feature data of the reference frame of the first image is stored.

At 360, the updated reference frame, i.e., the first image frame, is used to perform target tracking processing on the image frame behind the first image frame, i.e., predict the position of the tracking object in the image frame behind the first image frame.

It should be noted that, there is no limitation on the execution order between the operations of 320 and 330. For example, if the operation 330 is performed based on the frame number or factors other than the position of the tracking target in the first image frame, the operations 320 and 330 may be executed in parallel or any sequential order, and for another example, if the operation 330 is performed based on the position of the tracking target in the first image frame, the operation is executed after the operation 320.

In one or more optional embodiments, whether to use a first image frame as an updated reference frame is determined based on the position of a tracking target in a first image frame and the position of a tracking target in a reference frame.

In other embodiments, whether to use a first image frame as an updated reference frame is determined based on an interval between the first image frame and the reference frame.

For example, the first image frame is used as an updated reference frame in response to the interval between the first image frame and the reference frame meeting a preset condition. In some embodiments, the preset condition may be reaching a preset value. For example, a reference frame is updated once at every M frames, but the embodiments of the present disclosure are not limited hereto.

In the actual target tracking, since the motion of a tracking target is complex, the speed thereof is generally not constant. A reference frame may be dynamically adjusted for a $(t+1)^{th}$ frame of image frame by comparing the position of a tracking target in a $(t)^{th}$ frame with the position thereof in a reference frame, thereby obtaining a more appropriate location exemplar feature.

According to one or more embodiments of the present disclosure, if a $(t)^{th}$ frame is used to update a reference frame, i.e., a $(t)^{th}$ frame is used as an updated reference frame, a $(t+1)^{th}$ frame of image and its reference frame are adjacent to each other. While if the $(t)^{th}$ frame is not used as a reference frame, the reference frame is not updated, and in this case, the $(t+1)^{th}$ frame of image and its reference frame are separated by one or more image frames. For example, an image frame and the reference frame thereof are separated by N image frames, where N is a preset value greater than or equal to 2. The value of N may be determined according to application scenarios, and is not defined in the embodiments of the present disclosure.

According to one or more embodiments of the present disclosure, whether to use a first image frame as an updated reference frame is determined based on the distance between the position of a tracking target in a first image frame and the position of a tracking target in a reference frame. For example, it is determined that the first image frame is used as an updated reference frame in response to the distance reaching a particular value. For another example, it is determined that the first image frame is not used as an updated reference frame in response to the distance being less than a particular value, i.e., the reference frame is not updated. The distance between two positions may be determined by multiple approaches. For example, the distance between particular points such as a center point or a certain vertex of a bounding box of a tracking target in the first image frame, and a corresponding point of a bounding box of a tracking target in the reference frame as the distance between the position of the tracking target in the first image frame and the position of the tracking target in the reference frame, etc., which is not defined in the embodiments of the present disclosure.

According to one or more embodiments of the present disclosure, whether to use a first image frame as an updated reference frame is determined based on an intersection over union between a first bounding box of a tracking target in a first image frame and a second bounding box of a tracking target in a reference frame.

If the position of an image frame is predicted by always using feature data of the same reference frame, the position is inaccurate if the movement position of the tracking target is relatively large. Therefore, the feature data of the reference frame needs to be updated. When to update is determined optionally according to whether the intersection over union between the first bounding box of the tracking target and the second bounding box thereof in the reference frame is greater than a preset value, where the first bounding box is obtained based on at least one coordinate (for example, all the vertex coordinates) corresponding to the predicted position, while the second bounding box is obtained based on at least one coordinate (for example, all the vertex coordinates) corresponding to the tracking target in the reference frame.

According to one or more embodiments of the present disclosure, it is determined that a first image frame is used as an updated reference frame in response to an intersection over union between a first bounding box and a second bounding box being less than or equal to a preset threshold.

According to one or more embodiments of the present disclosure, it is determined not to update the reference frame in response to an intersection over union between a first bounding box and a second bounding box reaching a preset threshold.

The intersection over union refers to the ratio of the intersection to the union of two areas, and in the embodiments of the present disclosure, refers to the ratio of the intersection between the first bounding box and the second bounding box to the union of the first bounding box and the second bounding box. The lower the intersection over union, the larger the distance where a tracking target moves from a reference frame to a first image frame. In this case, the predicted position is inaccurate if the current reference frame is still used as the reference frame. Therefore, when the intersection over union is less than a set value, the first image frame is used as a reference frame.

According to one or more embodiments of the present disclosure, feature data corresponding to a reference frame is obtained by performing feature extraction on a first image frame to obtain the feature data of the updated reference frame; or a position coordination of a tracking target in a first image frame is determined, and is performed feature extraction to obtain the feature data of the updated reference frame.

If the absolute distance between the predicted position and the position in the reference frame is relatively close (the intersection over union between a first bounding box and a second bounding box is greater than or equal to a set threshold), the reference frame does not need to be updated, and the currently buffered feature data of the reference frame may be continually used for guiding the next image frame. If the absolute distance between the predicted position and the position in the reference frame is relatively far (the intersection over union between a first bounding box and a second bounding box is less than a set threshold), the position extraction feature of the first image frame may be used to update the feature data of the reference frame. By means of the dynamic adjustment mechanism, the previously calculated feature data (e.g. an intermediate feature map) may be fully utilized so as to reduce a large variety of unnecessary feature extraction processes.

For example, if a target tracking method is used to track an object having the absolute position stay unchanged basically in a video clip, a first image may always be used as a reference frame, which significantly increases the position speed of a tracking target in each video frame, thereby improving the tracking efficiency.

For a particular problem (tracking a particular target, such as, for example, face tracking), a targeted reference frame update policy may be used in an application to adjust the reference frame in the target tracking method, which has a strong promotion value.

In one or more optional embodiments, the following procedure is further included: storing feature data of a first image frame in response to determining to use the first image frame as an updated reference frame.

The generated feature data may be generated by means of buffer in the embodiments of the present disclosure. In order to save space, the feature data of the updated reference frame may be stored each time by replacing the feature data of the previous reference frame. When the position is required to be predicted, only the currently stored feature data needs to be invoked from a buffer. In some embodiments, the feature data of at least one reference frame may also be saved by the update time, and at least one feature data (for example, all includes the firstly generated feature data and the updated feature data) is stored. In this way, when the position is required to be predicted, the latest stored feature data is invoked as the feature data of the reference frame.

When a user uses a cell phone or a camera to detect a face and a common object, the common approach is to combine with a target tracking algorithm to increase the speed and reduce the power consumption of a device. According to the embodiments of the present disclosure, a feature buffer and feature reuse mechanism is used for the target tracking technology of a depth recurrent network, which may significantly increase the speed of a traditional recurrent tracker and implement the high-rate tracking at 1,500 fps on a particular task (face tracking). This is critical in the actual product application, and significantly increases the forward speed of the target tracking algorithm.

The embodiments of the present disclosure are to propose a feature buffer-based architecture and implement a practical high-precision and high-speed target tracking method. According to the present disclosure, a mechanism of maintaining and reusing an intermediate feature map of a recurrent network by means of feature buffer is proposed by analyzing the structure of the recurrent network. The embodiments of the present disclosure propose that the intermediate feature obtained through calculation is stored by a location exemplar buffer (a location exemplar obtained by a reference frame branch through calculation), and the previously buffered location exemplar is reused in the subsequent tracking process, thereby quickly tracking an object by using multiple reference frame exemplars. The method proposed in the embodiments of the present disclosure may be applied to multiple types of target tracking scenarios, increases the running speed of a depth recurrent network-based target tracking algorithm as nearly twice as the original speed, significantly improves the real-time tracking performance, and reduces the power consumption of a device.

The target tracking algorithm proposed in the embodiments of the present application increases the speed of the target tracking system of the traditional depth recurrent network as nearly once while guaranteeing the precision. The feature reuse-based recurrent architecture proposed in the present disclosure significantly improves the precision-speed equilibrium curve of a tracker for a particular task (face tracking). On one hand, the speed may be increased while maintaining the precision. On the other hand, the network expression capability may also be improved without changing the speed, and the precision of a target tracker is improved.

The experiment result of face tracking on a long-sequence video (for example, 7,289 frames) is as follows: Table 1 is a comparison table of indicator values obtained by applying different tracking methods in the experiment to track. As shown in Table 1, the policy of dynamically updating the location exemplar feature of a reference frame is used in the experiment. It may be seen that the speed is increased as nearly once while maintaining the precision unchanged. In fact, the policy of not determining to use the previous frame as a reference frame may slightly improve the precision due to the fact that the precision of the detected frame is high, and the earlier frame is more accurate. The error accumulation problem may be efficiently solved by using an earlier frame as a reference frame for tracking.

TABLE 1

Comparison table of indicator values for tracking by different tracking methods

| Tracking method | Indicator | | |
|---|---|---|---|
| | Speed (ms) | Robustness ([0.2:0.5]) | Precision ([0.5:0.95]) |
| 16 Channel tracker | 0.4015 | 0.771 | 0.568 |
| 16 Channel + feature reuse | 0.2944 | 0.772 | 0.579 |
| 8 Channel tracker | 0.2716 | 0.768 | 0.540 |
| 8 Channel + feature reuse | 0.1808 | 0.768 | 0.545 |

A person of ordinary skill in the art may understand that: all or some operations for implementing the foregoing method embodiments are achieved by a program by instructing related hardware; the foregoing program may be stored in a computer readable storage medium; and when the program is executed, the operations including the foregoing method embodiments are executed. Moreover, the foregoing storage medium includes various media capable of storing program codes, such as a ROM, a RAM, a magnetic disk, or an optical disk.

Figure 4:
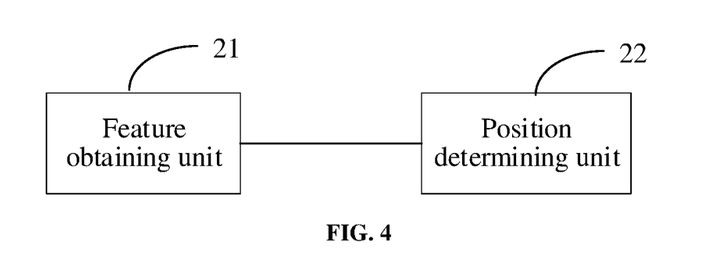
FIG. 4 is a schematic structural diagram of a target tracking apparatus provided in embodiments of the present disclosure.

FIG. 4 is a schematic structural diagram of a target tracking apparatus provided in embodiments of the present disclosure. The apparatus is configured to implement the foregoing method embodiments of the present disclosure. As shown in FIG. 4, the apparatus includes:

a feature obtaining unit 21, configured to obtain feature data of a reference frame.

The reference frame corresponds to at least two image frames. In order to track a tracking target, in some embodiments, multiple image frames of the tracking target are collected by means of video and the like, and the position of the tracking target in these image frames is determined, so that the trajectory of the tracking target in these target images by time may be determined by combining the time for obtaining the image frames, thereby realizing tracking of the tracking target.

In some embodiments, in order to track a tracking target, it is required to know the position of the tracking target in one image frame, and the tracking target currently required to be tracked is determined based on the position; or it is known that the tracking target is a certain particular target (for example, a face or human body), multiple image frames are collected for the determined tracking target.

According to one or more embodiments of the present disclosure, according to the definition of a target tracking issue, tracking of a tracking target may be realized based on the determined position of the tracking target in one or more images. The tracking target in the embodiments of the present disclosure may be a known or an unknown particular object, human or an object of other types, which is not defined in the embodiments of the present disclosure.

In the embodiments of the present disclosure, at least two image frames use a same reference frame, and in some embodiments, the at least two image frames are adjacent to each other. For example, in the embodiments of the present disclosure, the reference frame is updated once at every M frames, and adjacent (M−1) image frames correspond to a same reference frame, where M is a preset value greater than or equal to 2, and the preset value may be determined according to actual application requirements. However, the value of M and the implementations of the multiple image frames using a same reference frame are not defined in the embodiments of the present disclosure.

In one or more optional embodiments, a feature obtaining unit 21 may obtain the stored feature data of a reference frame. For example, feature data of a reference frame is obtained from a memory. In some embodiments, feature data of a reference frame may be stored in a buffer, and is then obtained from the buffer, but the embodiments of the present disclosure are not limited hereto.

A position determining unit 22 is configured to determine the position of a tracking target in a first image frame based on feature data of a reference frame.

According to one or more embodiments of the present disclosure, the first image frame is separated from the reference frame by at least one image frame.

In some optional embodiments, the position determining unit 22 may include:

a feature extraction module, configured to perform feature extraction on a first image frame to obtain feature data of the first image frame; and a position module, configured to obtain the position of a tracking target in the first image frame based on the feature data of a reference frame and the feature data of the first image frame.

According to one or more embodiments of the present disclosure, feature extraction may be performed on an image frame by means of a neural network. For example, a convolution operation is performed on a first image frame by means of a convolutional layer in a convolutional neural network, to obtain feature data of the first image frame, where the feature data may optionally be a feature map or in other formats. The manner of extracting the feature data and the specific implementation formats of the obtained feature data are not limited in the embodiments of the present disclosure.

According to one or more embodiments of the present disclosure, the position module may be configured to connect (or splice) feature data of a first image frame and that of a reference frame to obtain a connection feature or a splicing feature, and the position of a tracking target in the first image frame is obtained based on the connection feature or the splicing feature.

In some optional embodiments, the position determining unit 22 is configured to obtain, based on feature data of the reference frame, relative position information of a tracking target in a first image frame relative to the tracking target in a reference frame; and obtain the position of the tracking target in the first image frame based on the relative position information and position information of the tracking target in the reference frame.

According to one or more embodiments of the present disclosure, the relative difference between a first image frame and a reference frame may be determined based on feature data of the reference frame and that of the first image frame, and relative position information of a tracking target in the first image frame and the reference frame may be determined based on the relative difference between the feature data. The relative position information herein may indicate the relative distance of the tracking target moving from the reference frame to the first image frame. Since position information of the tracking target in the reference frame is known, the position of the tracking target in the first image frame may be determined based on the known position information of the reference frame as well as the relative position information.

According to the target tracking apparatus provided in the embodiments of the present disclosure, feature data of a reference frame of a first image frame is obtained, and the position of a tracking target in the first image frame is determined based on the feature data of the reference frame. Since the first image frame and at least one second image frame have a same reference frame, reuse of the feature data is implemented, thereby reducing the number of times calculation is performed on the feature data, and increasing the tracking speed.

In one or more optional embodiments, the apparatus further includes:

a reference determining unit, configured to determine whether to use a first image frame as an updated reference frame based on the position of a tracking target in the first image frame and the position of the tracking target in the reference frame.

According to one or more embodiments of the present disclosure, a first image frame is used as an updated reference frame if an interval between the first image frame and the reference frame meets a preset condition.

In the actual target tracking, since the motion of a tracking target is complex, the speed thereof is generally not constant. A reference frame may be dynamically adjusted for a $(t)^{th}$ frame of image frame by comparing the absolute position obtained by means of a reference frame with the absolute position thereof, thereby obtaining a more appropriate location exemplar feature.

According to one or more embodiments of the present disclosure, if a $(t)^{th}$ frame is used to update a reference frame, i.e., a $(t)^{th}$ frame is used as an updated reference frame, a $(t+1)^{th}$ frame of image and its reference frame are adjacent to each other. While if the $(t)^{th}$ frame is not used as a reference frame, the reference frame is not updated, and in this case, the $(t+1)^{th}$ frame of image and its reference frame are separated by one or more image frames. For example, an image frame and the reference frame thereof are separated by N image frames, where N is a preset value greater than or equal to 2. The value of N may be determined according to application scenarios, and is not defined in the embodiments of the present disclosure.

According to one or more embodiments of the present disclosure, a reference determining unit is configured to determine whether to use a first image frame as an updated reference frame based on an intersection over union between a first bounding box of a tracking target in a first image frame and a second bounding box of a tracking target in a reference frame.

According to one or more embodiments of the present disclosure, a reference determining unit is configured to, in response to the intersection over union between the first bounding box and the second bounding box being less than or equal to a preset threshold, determine to use a first image frame as an updated reference frame.

According to one or more embodiments of the present disclosure, the reference determining unit is further configured to store feature data of a reference frame in response to using the first image as the reference frame.

According to another aspect of the embodiments of the present disclosure, an electronic device is provided, including a processor, where the processor includes the target tracking apparatus according to any one of the foregoing embodiments of the present disclosure.

According to another aspect of the embodiments of the present disclosure, an electronic device is provided, including a memory, configured to store executable instructions;

and a processor, configured to communicate with the memory to execute an executable instruction to achieve any one of the foregoing embodiments of the target tracking method provided in the present disclosure.

According to another aspect of the embodiments of the present disclosure, a computer storage medium is provided, configured to store computer-readable instructions, where when the instructions are executed by a processor, the processor implements any one of the foregoing embodiments of the target tracking method provided in the present disclosure.

According to another aspect of the embodiments of the present disclosure, a computer program is provided, including a computer readable code, where when the computer readable code runs in a device, a processor in the device executes the target tracking method provided in the present disclosure.

According to yet another aspect of the embodiments of the present disclosure, a computer program product is provided, configured to store computer-readable instructions, where when the instructions are executed, the computer implements the target tracking method according to any one of the foregoing possible implementations.

In one or more optional embodiments, the embodiments of the present disclosure further provide a computer program product, configured to store computer-readable instructions, where when the instructions are executed, a computer executes the target tracking method in any one of the foregoing embodiments.

The computer program product is specifically implemented by means of hardware, software, or a combination thereof. In an optional example, the computer program product is specifically represented by a computer storage medium. In another example, the computer program product is represented by a software product, such as Software Development Kit (SDK).

The embodiments of the present disclosure further provide another target tracking method and a corresponding apparatus thereof, an electronic device, a computer storage medium, a computer program, and a computer program product, where the method includes: obtaining feature data of a reference frame of a first image frame, where the reference frame and the first image frame are separated by at least one second image frame; and determining a position of a tracking target in the first image frame based on the feature data of the reference frame.

In some embodiments, the target tracking indication is specifically an invoking instruction. The first apparatus instructs, by means of invoking, the second apparatus to execute target tracking. Accordingly, in response to receiving the invoking instruction, the second apparatus executes the operations and/process in any one of the embodiments of the foregoing target tracking method.

It should be understood that the terms such as "first" and "second" in the embodiments of the present disclosure are only used for distinguishing, and shall not be understood as limitations on the embodiments of the present disclosure.

It should also be understood that, in the present disclosure, "multiple" may refer to two or more, and "at least one" may refer to one, two or more.

It should also be understood that, for any component, data or structure mentioned in the present disclosure, if there is no explicit limitation or no opposite motivation is provided in context, it is generally understood that the number of the component, data or structure is one or more.

It should be further understood that the description of each embodiment of the present disclosure emphasizes differences between the embodiments, and the same or similar points therebetween may be used as reference and omitted for clarity.

Figure 5:
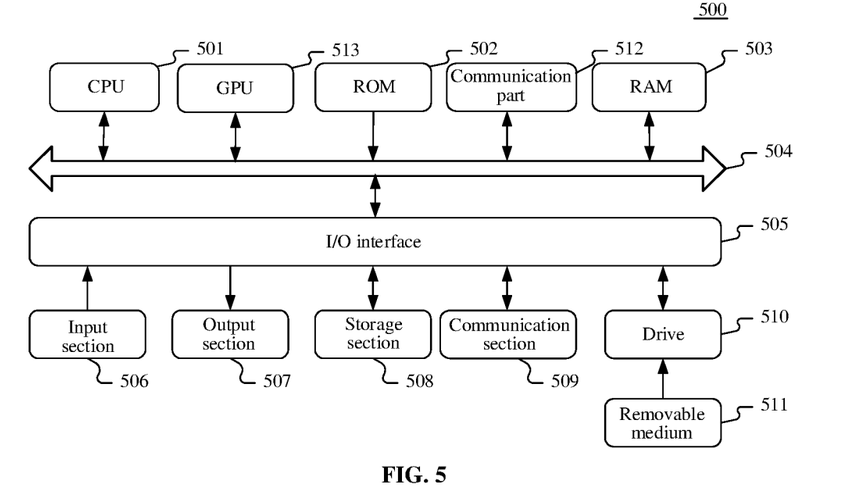
FIG. 5 is a schematic structural diagram of an electronic device suitable for implementing a terminal device or a server in the embodiments of the present disclosure.

The embodiments of the present disclosure further provide an electronic device which, for example, is a mobile terminal, a Personal Computer (PC), a tablet computer, a server, and the like. Referring to FIG. 5 below, a schematic structural diagram of an electronic device 500 suitable for implementing a terminal device or a server in the embodiments of the present application is shown. As shown in FIG. 5, the computer system 500 includes one or more processors, a communication part, and the like. The one or more processors are, for example, one or more Central Processing Units (CPUs) 501 and/or one or more Graphic Processing Units (GPUs) 513, and the processor may execute appropriate actions and processing according to executable instructions stored in a ROM 502 or executable instructions loaded from a storage section 508 to a RAM 503. The communication part 512 may include, but is be limited to, a network card. The network card may include, but is not limited to, an Infiniband (IB) network card.

The processor may communicate with the ROM 502 and/or the RAM 503 to execute executable instructions, is connected to the communication part 512 by means of a bus 504, and communicates with other target devices by means of the communication part 512, so as to complete corresponding operations of any of the methods provided by the embodiments of the present application, for example, obtaining feature data of a reference frame of a first image frame, where the first image frame and at least one second image frame have a same reference frame; and determining the position of a tracking target in the first image frame.

In addition, the RAM 503 may further store various programs and data required for operations of the apparatus. The CPU 501, the ROM 502, and the RAM 503 are connected to each other by means of the bus 504. In the presence of the RAM 503, the ROM 502 is an optional module. The RAM 503 stores executable instructions, or writes the executable instructions into the ROM 502 during running, where the executable instructions cause the processor 501 to execute corresponding operations of the foregoing communication method. An Input/Output (I/O) interface 505 is also connected to the bus 504. The communication part 512 is integrated, or is configured to have multiple sub-modules (for example, multiple IB network cards) connected to the bus.

The following components are connected to the I/O interface 505: an input section 506 including a keyboard, a mouse and the like; an output section 507 including a Cathode-Ray Tube (CRT), a Liquid Crystal Display (LCD), a speaker and the like; the storage section 508 including a hard disk drive and the like; and a communication section 509 of a network interface card including an LAN card, a modem and the like. The communication section 509 performs communication processing via a network such as the Internet. A drive 510 is also connected to the I/O interface 505 according to requirements. A removable medium 511 such as a magnetic disk, an optical disk, a magneto-optical disk, a semiconductor memory or the like is mounted on the drive 510 according to requirements, so that a computer program read from the removable medium is installed on the storage section 508 according to needs.

It should be noted that the architecture shown in FIG. 5 is merely an optional implementation. During specific practice, the number and types of the components in FIG. 5 is selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of this disclosure.

Particularly, a process described above with reference to a flowchart according to the embodiments of the present disclosure may be implemented as a computer software program. For example, the embodiments of the present disclosure include a computer program product, including a computer program tangibly included on a machine readable medium; the computer program includes program codes for executing the method shown in the flowchart; the program codes may include corresponding instructions for executing operations of the method provided in the embodiments of the present application, for example, obtaining feature data of a reference frame of a first image frame, where the first image frame and at least one second image frame have a same reference frame; and determining the position of a tracking target in the first image frame. In such embodiments, the computer program is downloaded and installed from the network through the communication section 509, and/or is installed from the removable medium 511. The computer program, when being executed by the CPU 501, executes the foregoing functions defined in the methods of the present application.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure are implemented in many manners. For example, the methods and apparatuses of the present disclosure are implemented with software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present application, and to make a person of ordinary skill in the art understand the present disclosure, so as to design various embodiments with various modifications applicable to particular use.

The invention claimed is:

1. A target tracking method, comprising:
    obtaining feature data of a reference frame of a first image frame, wherein the first image frame and at least one second image frame have a same reference frame; and
    determining a position of a tracking target in the first image frame based on the feature data of the reference frame,
    wherein determining the position of the tracking target in the first image frame based on the feature data of the reference frame comprises:
        obtaining, based on the feature data of the reference frame, relative position information of the tracking target in the first image frame relative to the tracking target in the reference frame; and
        obtaining the position of the tracking target in the first image frame based on the relative position information and position information of the tracking target in the reference frame,
    wherein the method further comprises:
        determining whether the first image frame is used as an updated reference frame, which comprises:
            determining, based on an intersection over union between a first bounding box of the tracking target in the first image frame and a second bounding box of the tracking target in the reference frame, whether the first image frame is used as the updated reference frame, which specifically comprises:
                in response to the intersection over union between the first bounding box and the second bounding box being less than or equal to a preset threshold, determining that the first image frame is used as the updated reference frame; and
                in response to the intersection over union between the first bounding box and the second bounding box being greater than the preset threshold, determining that the reference frame does not need to be updated and the feature data of the reference frame is continually used for guiding a next image frame.

2. The method according to claim 1, wherein obtaining the feature data of the reference frame comprises:
    obtaining the feature data of the reference frame from a memory.

3. The method according to claim 1, wherein determining whether the first image frame is used as the updated reference frame further comprises:
    determining, based on an interval between the first image frame and the reference frame, whether the first image frame is used as the updated reference frame.

4. The method according to claim 1, further comprising:
    storing feature data of the first image frame in response to determining that the first image frame is used as the updated reference frame.

5. The method according to claim 1, wherein determining the position of the tracking target in the first image frame based on the feature data of the reference frame comprises:
    performing feature extraction on the first image frame to obtain feature data of the first image frame; and
    obtaining the position of the tracking target in the first image frame based on the feature data of the reference frame and the feature data of the first image frame.

6. The method according to claim 5, wherein obtaining the position of the tracking target in the first image frame based on the feature data of the reference frame and the feature data of the first image frame comprises:
    connecting the feature data of the first image frame to the feature data of the reference frame to obtain a connection feature; and
    obtaining the position of the tracking target in the first image frame based on the connection feature.

7. A target tracking apparatus, comprising:
    a processor; and
    a memory, configured for storing instructions executable by the processor, wherein the processor is configured to:
        obtain feature data of a reference frame of a first image frame, wherein the first image frame and at least one second image frame have a same reference frame;
        determine a position of a tracking target in the first image frame based on the feature data of the reference frame;
        obtain, based on the feature data of the reference frame, relative position information of the tracking target in the first image frame relative to the tracking target in the reference frame; and
        obtain the position of the tracking target in the first image frame based on the relative position information and position information of the tracking target in the reference frame,
    wherein the processor is configured to determine, based on an intersection over union between a first bounding box of the tracking target in the first image frame and a second bounding box of the tracking target in the reference frame, whether the first image frame is used as an updated reference frame,
    wherein the processor is specifically configured to:
        in response to the intersection over union between the first bounding box and the second bounding box being less than or equal to a preset threshold, determine that the first image frame is used as the updated reference frame; and in response to the intersection over union between the first bounding box and the second bounding box being greater than the preset threshold, determine that the reference frame does not need to be updated and the feature data of the reference frame is continually used for guiding a next image frame.

8. The apparatus according to claim 7, wherein the processor is configured to obtain the feature data of the reference frame from the memory.

9. The apparatus according to claim 7, wherein the processor is further configured to:
use the first image frame as the updated reference frame when an interval between the first image frame and the reference frame meets a preset condition.

10. The apparatus according to claim 7, wherein the processor is further configured to store the feature data of the first image frame in response to determining that the first image frame is used as the updated reference frame.

11. The apparatus of claim 7, wherein the processor is further configured to:
perform feature extraction on the first image frame to obtain feature data of the first image frame; and
obtain the position of the tracking target in the first image frame based on the feature data of the reference frame and the feature data of the first image frame.

12. A non-transitory computer storage medium, configured to store computer-readable instructions that, when being executed by a processor, cause the processor to execute a target tracking method, the target tracking method comprising:
obtaining feature data of a reference frame of a first image frame, wherein the first image frame and at least one second image frame have a same reference frame; and
determining a position of a tracking target in the first image frame based on the feature data of the reference frame,
wherein determining the position of the tracking target in the first image frame based on the feature data of the reference frame comprises:
obtaining, based on the feature data of the reference frame, relative position information of the tracking target in the first image frame relative to the tracking target in the reference frame; and
obtaining the position of the tracking target in the first image frame based on the relative position information and position information of the tracking target in the reference frame,
wherein the target tracking method further comprises:
determining whether the first image frame is used as an updated reference frame, which comprises:
determining, based on an intersection over union between a first bounding box of the tracking target in the first image frame and a second bounding box of the tracking target in the reference frame, whether the first image frame is used as the updated reference frame, which specifically comprises:
in response to the intersection over union between the first bounding box and the second bounding box being less than or equal to a preset threshold, determining that the first image frame is used as the updated reference frame; and
in response to the intersection over union between the first bounding box and the second bounding box being greater than the preset threshold, determining that the reference frame does not need to be updated and the feature data of the reference frame is continually used for guiding a next image frame.

13. The non-transitory computer storage medium according to claim 12, wherein obtaining the feature data of the reference frame comprises:
obtaining the feature data of the reference frame from a memory.

14. The non-transitory computer storage medium according to claim 12, wherein determining whether the first image frame is used as the updated reference frame further comprises:
determining, based on an interval between the first image frame and the reference frame, whether the first image frame is used as the updated reference frame.

* * * * *